Nov. 8, 1955 D. D. RUDY 2,723,227
PROCESS FOR CONTROLLING THE PROPERTIES OF LEAD PARTICLES
IN THE DISTILLATION OF TETRAETHYL LEAD
Filed June 23, 1954
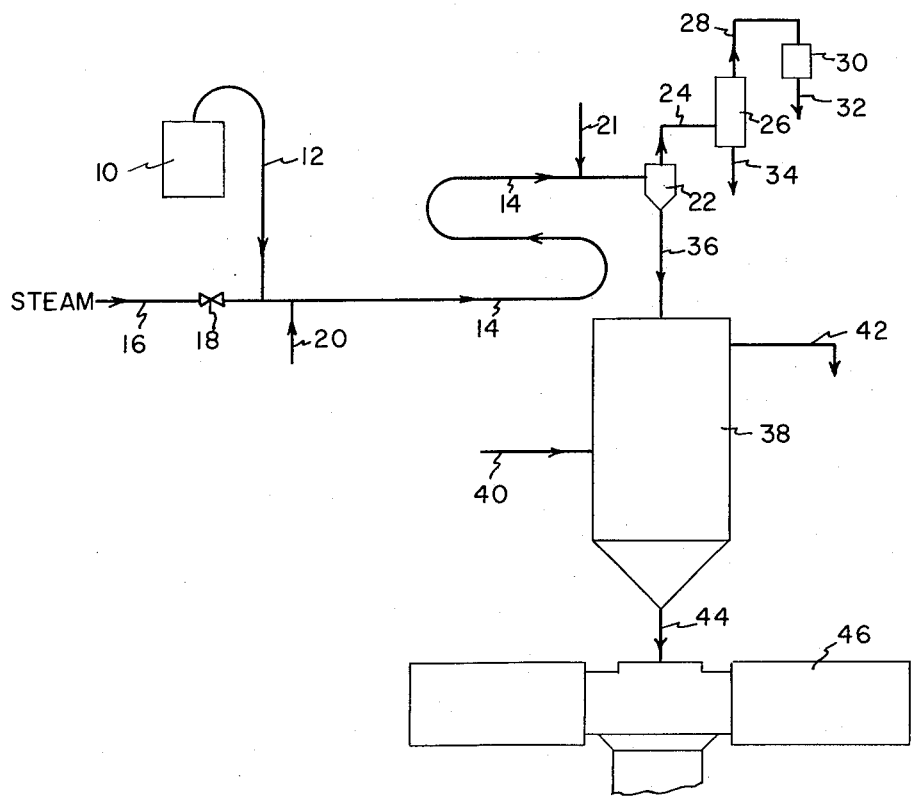
INVENTOR
DENNIS DALE RUDY
BY *Edwin E. Woodhouse*
ATTORNEY 2,723,227

PROCESS FOR CONTROLLING THE PROPERTIES OF LEAD PARTICLES IN THE DISTILLATION OF TETRAETHYL LEAD

Dennis Dale Rudy, Newark, Del., assignor to E. I. du Pont de Nemours and Company, Wilmington, Del., a corporation of Delaware Application June 23, 1954, Serial No. 438,835

10 Claims. (Cl. 202—46)

This invention relates to a process for controlling the properties of lead particles and, more particularly, to controlling the properties of lead particles during the continuous distillation of tetraethyllead and ethyl chloride from reaction masses formed in the manufacture of tetraethyllead.

In the manufacture of tetraethyllead, according to the equation

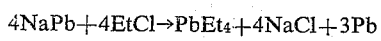

4NaPb+4EtCl→PbEt₄+4NaCl+3Pb the reaction mass produced consists of solid metallic lead and sodium chloride, together with a liquid phase of tetraethyllead and an unreacted excess of ethyl chloride. If a rather large excess of the latter is used, the reaction mass consists of a slurry of the lead and salt particles in the ethyl chloride and tetraethyllead. Usually, the ethyl chloride and the tetraethyllead have been recovered by batch steam distillation. It is well known that, during this distillation, the lead, which is originally formed as fine particles, later tends to agglomerate to an uncontrollable extent, unless special precautions are taken, eventually forming large, intractable masses which are very troublesome to remove from the distilling equipment. It has been known for some time, however, that this agglomeration may be overcome by adding, to the reaction mass or the aqueous slurries thereof prior to distillation, various "still-aids" such as chromates and dichromates, thiosulfates and ferric chloride.

More recently, completely continuous processes have been developed for reacting ethyl chloride with sodium-lead alloy and for recovering the tetraethyllead. One process for recovering the tetraethyllead and the ethyl chloride from the reaction mass involves passing the reaction mass, mixed with water and steam, through a tube under conditions of turbannular flow, to separate the tetraethyllead and the ethyl chloride from the lead and the salt. Here the problem of agglomeration of the lead is very acute but yields to the use of "still-aids" in suitable amounts. See Rehm and Wingate Serial No. 272,454, filed February 19, 1952, and Patent No. 2,678,907 of Baldwin et al.

A further continuous process has been developed for recovering the lead from the aqueous slurry resulting from the above continuous steam distillation, by allowing the lead particles to settle and then pressing them between opposing solid pressure members at pressures of 1000 lbs. per sq. in. or higher to express nearly all of the residual aqueous solution and compact the lead particles into the form of pellets, blocks or bricks. Such process and a preferred form of press for carrying it out are disclosed in the application of MacMurray, Serial No. 292,641, filed June 10, 1952, now Patent No. 2,697,979, issued December 28, 1954.

It has been found, however, that the size of the lead particles formed in the distillation decreases as the amount of still-aid is increased and that as the lead particles become smaller, they become more difficult to process by the press of MacMurray. Thus, as the particles become finer, the presses and similar devices for compacting the lead have to be operated more slowly and with greater attention to clearances so as to retain the smaller particles and, as the particles become still smaller, much lead is actually lost. On the other hand, larger particles, resulting from the use of smaller proportions of still aids, tend to agglomerate spontaneously in later processing equipment, if not in the still itself. This tendency of the lead particles to agglomerate prematurely in equipment through which they must pass before the final compacting step (where the tendency to agglomerate is necessary) is particularly serious, as already pointed out, in the continuously operated equipment.

Thus, there is a tendency for lead deposits to collect and build-up where there is a change in velocity of the rapidly moving slurry, for example, on the walls of cyclone separators used to separate the steam, the ethyl chloride, and the tetraethyllead vapor from the aqueous slurry of the lead particles. Even though this accumulation may be slow, the operation must in time be shut down for cleaning or replacement, whereas the continuous operation could be carried on indefinitely if there were no lead accumulation. Particularly troublesome, however, is the behavior of slurry when the velocity is low and lead particles settle out, as in the washing equipment and in connecting piping. Here, if accumulations of lead particles, particularly those formed in the presence of the smaller proportions of still-aids, remain undisturbed for a short time, they become cemented together, forming a solid plug.

Thus, it will be seen that although the distillation process of Rehm and Wingate is entirely operable for the separation of the tetraethyllead reaction mass into its volatile and nonvolatile components, it becomes difficult, when the process is used in connection with the press of MacMurray for isolating the by-product lead, to set proportions of still-aids which will prevent the formation of lead deposits throughout all the required equipment and at the same time will allow the MacMurray press to operate readily and without loss. It has now been found, however, that lead particles of the proper size for compacting may be obtained without the formation of lead deposits in the distilling and auxiliary equipment and without using new chemicals or additional apparatus, by means of the invention hereinafter described.

It is an object of this invention to provide an improved process for continuously distilling tetraethyllead and ethyl chloride from reaction masses whereby the properties of the lead particles in such reaction masses are controlled. Another object is to modify the process of Rehm and Wingate by adding the still-aids at two points in the turbannular flow tube whereby the sizes of the lead particles and their tendency to agglomerate can be controlled so that they can be more easily and more effectively handled and processed further. Other objects are to provide a novel improved process and to advance the art. Still other objects will appear hereinafter.

The above and other objects may be accomplished in accordance with this invention which comprises the process for continuously distilling tetraethyllead and ethyl chloride from reaction masses, resulting from the reaction of sodium lead alloy with an excess of ethyl chloride, by mixing such a reaction mass with steam, water and a still-aid near the entrance of a long tube, passing the mixture through such tube under conditions of turbannular flow and discharging the mixture from the tube into a separating zone where the vapor phase is separated from the resulting aqueous slurry of finely divided lead, wherein the improvement consists in originally mixing with the reaction mass, in the presence of the steam and the water, only from about 0.05% to about 0.6% by weight, based on the weight of the tetraethyllead, of the still-aid and introducing into the mixture in the tube at a point between 50% and about 95% of the length of the tube additional amounts of the still-aid in a proportion of from about 0.3% to about 1% by weight based on the tetraethyllead.

Except for the addition of the still-aid at the two points and the proportions added at such points, the process corresponds to the processes disclosed by Rehm and Wingate and by Baldwin et al. According to such processes, the reaction mass is passed to the entrance of a stripper tube where it is mixed with from 0.2 to about 5 parts by weight of water for each part of lead, with from about 0.001 to about 1 part by weight of a still-aid for each part of lead, and with saturated steam at a temperature of from about 125° C. to about 188° C. in a proportion of from 0.09 to about 3 parts by weight for each part of ethyl chloride plus from 0.06 to about 2.4 parts by weight for each part of tetraethyllead, the rates of feed and the proportions being regulated so that the mixture at the entrance to the stripper tube is at an initial pressure of from 35 to 175 pounds per square inch absolute and an initial temperature of from about 95° C. to about 150° C.; passing such mixture through the stripper tube, having a smooth, unobstructed, uniform bore of from ¼ to about 10 inches in diameter and of from 50 to about 2,000 tube diameters in length and which is devoid of bends having a radius of curvature of less than 5 tube diameters, with annular flow at a vapor velocity of from about 100 to 700 feet per second with a pressure drop of at least 20 pounds per square inch but not to below substantially 15 pounds per square inch absolute and with a discharge temperature of from about 80° C. to about 140° C.; then discharging the mixture from the tube and separating the vapor phase from the liquid phase, the vapor phase being composed of steam and nearly all of the tetraethyllead and the ethyl chloride. The present invention is operable under any of the conditions disclosed by Rehm and Wingate and by Baldwin et al.

By adding the still-aids at the two points as herein specified, instead of all at the entrance to the tube as in Rehm and Wingate and in Baldwin et al., the size of the lead particles is controlled so that they are readily washed and compacted in the press of MacMurray without substantial loss due to fine particles and, at the same time, they are prevented from agglomerating to particles of excessive size and from accumulating at undesired points in the system.

The still-aids may be any of those which are known to the art. However, the water-soluble chromium compounds which yield cromate ions are much more effective in this process than the other known still-aids and are generally preferred. Such chromium compounds include sodium dichromate ($Na_2Cr_2O_7.2H_2O$), potassium dichromate, sodium chromate, potassium chromate, chromic acid, ammonium chromate, iron dichromate and magnesium chromate, the sodium and potassium dichromates and chromates being particularly preferred. Other still-aids, such as sodium thiosulfate and ferric chloride may be used, but, as pointed out above, they are much less effective than the chromium compounds in this process.

The proportions of the still-aids, added at each point, are critical. If materially less than 0.05% of still-aid is added at the entrance of the tube, the lead particles tend to adhere to the walls of the tube before reaching the second point of addition and to agglomerate into particles of a size too large to be effectively maintained in suspension in the lines and equipment downstream from the tube and to accumulate in and plug such lines and equipment. If materially more than 0.6% of still-aid is added at the entrance of the tube, the lead particles become too small for efficient and effective compacting in a press, but do not tend to adhere and may be carried as a slurry for long distances, as to the sludge pits used in the old batch process. If materially less than 0.3% of still-aid is added at the semond point, the particles will tend to agglomerate further and accumulate in lines and equipment down-stream from the tube and plug such lines and equipment. Materially more than 1% of still-aid at the second point serves no useful purpose, is uneconomical and, if sufficiently large, tends to prevent the compacting of the particles into pellets and blocks having the desired strength.

The specified proportions of the still-aids are particularly desirable with sodium dichromate. Ordinarily, it is preferred to employ from about 0.1% to about 0.2% by weight of sodium dichromate at the entrance of the tube and from about 0.6% to about 0.7% at the second location. Preferably, when the other water-soluble chromium compounds are employed, they will be in a proportion calculated to give an amount of chromate ion equivalent to the specified percentages of sodium dichromate.

The still-aids are added in solution or in suspension in water. The still-aid, added near the entrance of the tube, will be in solution in the water which is to be added at that point, the concentration of the still-aid therein depending upon the amount of water which is used and the desired proportion of still-aid, within the limits herein specified, desired in the mixture at such point. The concentration of still-aid, in the water added at the second point, will preferably be as high as will permit ready and accurate measurement and control of the proportion of still-aid to be added at such point, although the concentration can vary within fairly wide limits.

The size of the particles of lead leaving the tube depends largely on the initial concentration of still-aid in the mixture (at the entrance to the tube), and decreases as the concentration of still-aid increases. If no still-aid is added near the entrance of the tube, the lead particles tend to adhere to the walls of the tube up to the point at which still-aid is added, and also to agglomerate to an uncontrolled extent to particles which would be too large to handle satisfactorily in subsequent operations, such as in washing equipment. The size of the particles, leaving the tube and in other downstream parts of the equipment, is not materially altered by the still-aid added at the second point, but such additional still-aid is essential to prevent accumulation of the lead and pluggage in such other downstream parts of the equipment, such as in the vapor phase separator, in the washer and in the lines for transporting the aqueous suspension of lead particles.

It is necessary to introduce the additional still-aid at a point between 50% and about 95% of the length of the tube, measured from the entrance of the tube. If such additional amount of still-aid is added nearer the entrance of the tube, the results obtained do not differ greatly from adding all of the still-aid at the entrance to the tube. On the other hand, it is important that the additional still-aid be added at a sufficient distance from the discharge end of the tube so that it mixes completely with the lead slurry before it is discharged from the tube. The minimum distance required for such complete mixing is about 95% of the length of the tube, i. e., about 5% from the discharge end of the tube. Ordinarily, it will be preferred to introduce the additional still-aid at a point from about 75% to about 95% of the length of the tube, most preferably from about 85% to 95% thereof.

One form of apparatus, which is particularly adapted for carrying out the preferred embodiments of the process of this invention, is illustrated diagrammatically in the accompanying drawing. A vessel 10, containing the reaction mass to be treated, is connected by a feed line 12 to the entrance of an elongated, insulated stripper tube 14. A steam pipe 16, having a valve 18 is connected to the entrance of the stripper tube 14, adjacent the end of the feed line 12. Conventionally, the end of the steam pipe is connected to one end of a T union, the stripper tube being connected to the other end and the feed line 12 being connected to the side branch of the T union.

A venturi tube or other type of union having 3 branches may be used in place of the T union. A water supply pipe 20 is also connected to the stripper tube 14 near the entrance thereof. The water introduced through 20 will contain the still-aid in a concentration to provide from about 0.05% to about 0.6% by weight based on the weight of the tetraethyllead. A line 21 in the second half of the stripper tube 14 is provided for introducing water containing additional still-aid in a proportion of about 0.3% to about 1% by weight based on the weight of the tetraethyllead. The discharge end of the stripper tube is connected with a cyclone separator 22.

The cyclone separator 22 receives the material from the stripper tube 14 and separates it into the liquid phase (a suspension of finely-divided lead usually in a dilute aqueous solution of sodium chloride) and the vapor phase which comprises a mixture of vapors of tetraethyllead, water and ethyl chloride. The vapor phase passes off through line 24, through a precooler if desired, to a fractionating column 26 from which most of the ethyl chloride passes as a vapor through line 28 into condenser 30. The wet condensed ethyl chloride leaves the condenser through line 32 to equipment (not shown) for separation of the water therefrom. In the column 26, the tetraethyllead, most of the water and some ethyl chloride are condensed at a temperature of from about 90° C. to 100° C. and at a pressure of about 65 p. s. i. a. Such liquid mixture is drawn off through line 34 and passed to equipment (not shown) for further purifying the tetraethyllead.

The liquid phase, separated in the cyclone 22, is discharged through line 36 into the top of a washer 38. Water is introduced through pipe 40 and is discharged through pipe 42. The lead particles fall through the upwardly flowing water whereby they are washed to remove most of the salt. The lead particles drop to the bottom of the washer and are discharged through pipe 44 to a press 46 which, preferably, is of the character disclosed by MacMurray, before referred to.

In order to more clearly illustrate this invention, preferred modes of carrying it into effect, and the advantageous results to be obtained thereby, the following examples are given:

EXAMPLE 1

Employing the apparatus shown in the drawings, fluid reaction mass (consisting substantially of tetraethyllead, metallic lead, and sodium chloride dissolved or suspended in ethyl chloride and resulting from the reaction of NaPb with an excess of ethyl chloride in a continuous process) was fed continuously with saturated steam and hot water containing a small amount of sodium dichromate through the tube 14 which was 100 ft. long to strip out the volatile organic compounds. The material passed through this tube, which is often called a stripper, by turbannular flow. Eight feet from the exit of the stripping tube, a second stream of an aqueous solution of sodium dichromate was introduced and thoroughly mixed at once with the liquid phase. Before reaching the end of the stripper, the ethyl chloride and the tetraethyllead were substantially completely vaporized. The cyclone separator 22, connected with the end of the stripper, separated the vapor phase (consisting essentially of steam, ethyl chloride, and tetraethyllead) from the slurry of finely divided lead particles in dilute aqueous sodium chloride.

The pertinent compositions and physical conditions were as follows:

Reaction mass: Percent
    Ethyl chloride _____ 61.1
    Tetraethyllead _____ 9.7
    Lead _____ 21.5
    Sodium chloride _____ 7.7

Feed to stripper: Percent
    Reaction mass, 122° C _____ 53.8
    Steam 176° C _____ 29.8
    Water 137° C _____ 16.5
    Na2Cr2O7.2H2O—at entrance_____ 0.008
    Na2Cr2O7.2H2O—ft. from end_____ 0.036

Expressed differently, the dichromate introduced at the entrance of the stripper was 0.15% of the tetraethyllead or 0.067% of the lead and the dichromate introduced near the end was 0.7% of the tetraethyllead or 0.31% of the lead.

The lead slurry from the cyclone separator (containing about 30% lead) was passed to the washer 38. A clear effluent containing most of the salt overflowed at the top of the washer. The lead particles sinking through the column thus moved countercurrent to the wash water and formed a paste (containing about 85% lead) at the bottom of the washer, whence it passed into the press 46, in which the lead was compacted into cylindrical blocks with removal of most of the residual water. The operation of the press 46 to form the lead blocks was continuous.

When the stripper was operated with the introduction of the two streams of sodium dichromate in the proportions given above, and the slurry was then processed as described, there was no trouble from accumulation of lead at any point in the system. The size distribution of the lead particles leaving the stripper was such that 80% had a radius greater than 65 microns. They compacted readily in the press without substantial loss due to fine particles.

When the proportion of sodium dichromate added at the entrance of the stripper was 0.7% and the other conditions were kept the same, including the addition of 0.7% of sodium dichromate 8 feet from the discharge end of the tube, the operation of the stripper was again satisfactory and there was no tendency for the particles to stick together or to accumulate at any point in the washing system or connecting lines. The particle size, however, was about 30 microns, somewhat too small for efficient compacting in the press.

On the other hand, when 0.45% of dichromate (based on the tetraethyllead) was added at the entrance to the stripper and none at the second location, pluggage resulted, after only a few hours operation, in the equipment subsequent to the stripper and separator, even though the operation of the stripper itself was satisfactory.

In other examples, summarized in Table I, the rates of feed of sodium dichromate were as indicated in such table, the conditions being otherwise the same as in Example 1. In each case, the equipment performed satisfactorily, without forming deposits of lead and with the efficient production of the lead blocks.

Table I

| Example No. | $Na_2Cr_2O_7 \cdot 2H_2O$, as percent of Tetraethyllead, added— | |
|---|---|---|
| | at Stripper Entrance | 8 feet from End |
| 2 | 0.09 | 0.40 |
| 3 | 0.53 | 0.40 |
| 4 | 0.18 | 0.70 |
| 5 | 0.53 | 0.60 |
| 6 | 0.06 | 0.30 |
| 7 | 0.23 | 0.70 |
| 8 | 0.11 | 0.60 |
| (1) | (0.15) | (0.70) |

It will be understood that the drawing and examples are given for illustrative purposes solely, and that this invention is not limited to the specific embodiments disclosed therein. On the other hand, it is apparent that many variations and modifications can be made in the still-aids, the proportions thereof, the conditions, and the apparatus, within the limits set forth in the general description, without departing from the spirit or scope of this invention.

From the preceding description, it will be apparent that this invention provides a novel and simple process for continuously recovering tetraethyllead and ethyl chloride from the reaction masses produced in the manufacture of tetraethyllead. Particularly, it provides an important improvement over the processes of Rehm and Wingate and Baldwin et al., whereby the sizes and other characteristics of the lead particles can be readily and simply controlled so that they can be more efficiently and effectively handled and processed further. Accordingly, it will be obvious that this invention constitutes an important and valuable advance in, and contribution to, the art.

What is claimed is:

1. In the process for continuously distilling tetraethyllead and ethyl chloride from a reaction mass, resulting from the reaction of sodium lead alloy with an excess of ethyl chloride, wherein such reaction mass is mixed with steam, water and a still-aid near the entrance of a long tube and the mixture is passed through such tube under conditions of turbannular flow and then discharged to a separating zone where the vapor phase is separated from the resulting aqueous slurry of finely divided lead, the improvement which consists in mixing with the reaction mass, in the presence of the steam and water near the entrance end of the tube, from about 0.05% to about 0.6% by weight, based on the weight of the tetraethyllead, of the still-aid and introducing into the mixture in the tube at a point between 50% and about 95% of the length of the tube additional amounts of the still-aid in a proportion of from about 0.3% to about 1% by weight based on the tetraethyllead.

2. In the process for continuously distilling tetraethyllead and ethyl chloride from a reaction mass, resulting from the reaction of sodium lead alloy with an excess of ethyl chloride, wherein such reaction mass is mixed with steam, water and a still-aid near the entrance of a long tube and the mixture is passed through such tube under conditions of turbannular flow and then discharged to a separating zone where the vapor phase is separated from the resulting aqueous slurry of finely divided lead, the improvement which consists in mixing with the reaction mass, in the presence of the steam and the water near the entrance end of the tube, a still-aid which is a water-soluble chromium compound yielding chromate ions in a proportion equivalent to from about 0.05% to about 0.6% by weight, based on the weight of the tetraethyllead, of sodium dichromate and introducing into the mixture in the tube at a point between 50% and about 95% of the length of the tube additional amounts of such still-aid in a proportion equivalent to from about 0.3% to about 1% by weight of sodium dichromate based on the tetraethyllead.

3. In the process for continuously distilling tetraethyllead and ethyl chloride from a reaction mass, resulting from the reaction of sodium lead alloy with an excess of ethyl chloride, wherein such reaction mass is mixed with steam, water and a still-aid near the entrance of a long tube and the mixture is passed through such tube under conditions of turbannular flow and then discharged to a separating zone where the vapor phase is separated from the resulting aqueous slurry of finely divided lead, the improvement which consists in mixing with the reaction mass, in the presence of the steam and the water near the entrance end of the tube, a still-aid which is a water-soluble chromium compound yielding chromate ions in a proportion equivalent to from about 0.1% to about 0.2% by weight, based on the weight of the tetraethyllead, of sodium dichromate and introducing into the mixture in the tube at a point between 50% and about 95% of the length of the tube additional amounts of such still-aid in a proportion equivalent to from about 0.6 to about 0.7% by weight of sodium dichromate based on the tetraethyllead.

4. In the process for continuously distilling tetraethyllead and ethyl chloride from a reaction mass, resulting from the reaction of sodium lead alloy with an excess of ethyl chloride, wherein such reaction mass is mixed with steam, water and a still-aid near the entrance of a long tube and the mixture is passed through such tube under conditions of turbannular flow and then discharged to a separating zone where the vapor phase is separated from the resulting aqueous slurry of finely divided lead, the improvement which consists in mixing with the reaction mass, in the presence of the steam and the water near the entrance end of the tube, a still-aid which is a water-soluble chromium compound yielding chromate ions in a proportion equivalent to from about 0.05% to about 0.6% by weight, based on the weight of the tetraethyllead, of sodium dichromate and introducing into the mixture in the tube at a point between from about 85% to about 95% of the length of the tube additional amounts of such still-aid in a proportion equivalent to from about 0.3% to about 1% by weight of sodium dichromate based on the tetraethyllead.

5. In the process for continuously distilling tetraethyllead and ethyl chloride from a reaction mass, resulting from the reaction of sodium lead alloy with an excess of ethyl chloride, wherein such reaction mass is mixed with steam, water and a still-aid near the entrance of a long tube and the mixture is passed through such tube under conditions of turbannular flow and then discharged to a separating zone where the vapor phase is separated from the resulting aqueous slurry of finely divided lead, the improvement which consists in mixing with the reaction mass, in the presence of the steam and the water near the entrance end of the tube, a still-aid which is a water-soluble chromium compound yielding chromate ions in a proportion equivalent to from about 0.1% to about 0.2% by weight, based on the weight of the tetraethyllead, of sodium dichromate and introducing into the mixture in the tube at a point from about 85% to about 95% of the length of the tube additional amounts of such still-aid in a proportion equivalent to from about 0.6% to about 0.7% by weight of sodium dichromate based on the tetraethyllead.

6. In the process for continuously distilling tetraethyllead and ethyl chloride from a reaction mass, resulting from the reaction of sodium lead alloy with an excess of ethyl chloride, wherein such reaction mass is mixed with steam, water and a still-aid near the entrance of a long tube and the mixture is passed through such tube under conditions of turbannular flow and then discharged to a separating zone where the vapor phase is separated from the resulting aqueous slurry of finely divided lead, the improvement which consists in mixing with the reaction mass, in the presence of the steam and the water near the entrance end of the tube, from about 0.05% to about 0.6% by weight, based on the weight of the tetraethyllead, of sodium dichromate as the still-aid and introducing into the mixture in the tube at a point between 50% and about 95% of the length of the tube additional amounts of sodium dichromate in a proportion of from about 0.3% to about 1% by weight based on the tetraethyllead.

7. In the process for continuously distilling tetraethyllead and ethyl chloride from a reaction mass, resulting from the reaction of sodium lead alloy with an excess of ethyl chloride, wherein such reaction mass is mixed with steam, water and a still-aid near the entrance of a long tube and the mixture is passed through such tube under conditions of turbannular flow and then discharged to a separating zone where the vapor phase is separated from the resulting aqueous slurry of finely divided lead, the improvement which consists in mixing with the reaction mass, in the presence of the steam and the water near the entrance end of the tube, from about 0.1% to about 0.2% by weight, based on the weight of the tetraethyllead, of sodium dichromate as the still-aid and introducing into the mixture in the tube at a point between 50% and about 95% of the length of the tube additional amounts of sodium dichromate in a proportion of from about 0.6% to about 0.7% by weight based on the tetraethyllead.

8. In the process for continuously distilling tetraethyllead and ethyl chloride from a reaction mass, resulting from the reaction of sodium lead alloy with an excess of ethyl chloride, wherein such reaction mass is mixed with steam, water and a still-aid near the entrance of a long tube and the mixture is passed through such tube under conditions of turbannular flow and then discharged to a separating zone where the vapor phase is separated from the resulting aqueous slurry of finely divided lead, the improvement which consists in mixing with the reaction mass, in the presence of the steam and the water near the entrance end of the tube, from about 0.05% to about 0.6% by weight, based on the weight of the tetraethyllead, of sodium dichromate as the still-aid and introducing into the mixture in the tube at a point from about 85% to about 95% of the length of the tube additional amounts of sodium dichromate in a proportion of from about 0.3% to about 1% by weight based on the tetraethyllead.

9. In the process for continuously distilling tetraethyllead and ethyl chloride from a reaction mass, resulting from the reaction of sodium lead alloy with an excess of ethyl chloride, wherein such reaction mass is mixed with steam, water and a still-aid near the entrance of a long tube and the mixture is passed through such tube under conditions of turbannular flow and then discharged to a separating zone where the vapor phase is separated from the resulting aqueous slurry of finely divided lead, the improvement which consists in mixing with the reaction mass, in the presence of the steam and the water near the entrance end of the tube, from about 0.1% to about 0.2% by weight, based on the weight of the tetraethyllead, of sodium dichromate as the still-aid and introducing into the mixture in the tube at a point from about 85% to about 95% of the length of the tube additional amounts of sodium dichromate in a proportion of from about 0.6% to about 0.7% by weight based on the tetraethyllead.

10. In the process for continuously distilling tetraethyllead and ethyl chloride from a reaction mass, resulting from the reaction of sodium lead alloy with an excess of ethyl chloride, wherein such reaction mass is mixed with steam, water and a still-aid near the entrance of a long tube and the mixture is passed through such tube under conditions of turbannular flow and then discharged to a separating zone where the vapor phase is separated from the resulting aqueous slurry of finely divided lead, the improvement which consists in mixing with the reaction mass, in the presence of the steam and the water near the entrance end of the tube, about 0.2% by weight, based on the weight of the tetraethyllead, of sodium dichromate as the still-aid and introducing into the mixture in the tube at a point about 92% of the length of the tube additional amounts of sodium dichromate in a proportion of about 0.7% by weight based on the tetraethyllead.

No references cited.